United States Patent Office.

J. B. RAND, OF CONCORD, NEW HAMPSHIRE.

*Letters Patent No.* 87,968, *dated March* 16, 1869; *reissue No.* 3,505, *dated June* 15, 1869.

IMPROVED COMPOSITION FOR WELDING IRON AND STEEL.

The Schedule referred to in these Letters Patent and making part of the same.

*Know all men by these presents:*

That I, J. B. RAND, of Concord, county of Merrimack, and State of New Hampshire, have invented a new and useful Composition, to be Used as a Substitute for Borax in Welding Iron and Steel.

The nature of my invention consists of a composition, made by combining and mixing the following ingredients, namely, ground quartz, chloride of sodium, alum, bitartrate of potassa, copperas, carbonate of soda, muriate of ammonia, sulphate of magnesia, and phosphate of iron.

The quartz I use, and which I prefer, is found in Lyndeborough, New Hampshire, which is a good quality of white quartz, but I do not limit myself to the quartz of this mine, as no doubt a like material may be found in other places.

In carrying out my invention, I have the quartz crushed and ground fine. I also pulverize the other articles named above, and mix them in the following proportions:

Twenty-five pounds of ground quartz.
Nine ounces of chloride of sodium.
One ounce of alum.
One-fourth ounce bitartrate of potassa.
One ounce of carbonate of soda.
Eight ounces of copperas.
Four ounces of muriate of ammonia.
Half an ounce of sulphate of magnesia.
One ounce of phosphate of iron.

When the ingredients are thoroughly mixed together, the composition is ready for use.

The above proportions may be varied, without materially affecting the character or value of the compound.

This composition is to be used for the purpose of welding iron and steel, substantially in the same manner that borax is used in the welding-process.

Iron and steel will stand a greater degree of heat, without injury, with the use of this composition, than they will with borax. Besides, the cost of this composition is very much less than borax, necessary to do the same amount of work, and does not injure iron and steel welded with it, as borax does.

I cannot explain the chemical action these ingredients have upon each other, in forming this welding-composition, but from numerous tests and experiments, in combining different materials, for a few years past, in order to produce the best compound for welding-purposes, I am satisfied that this is better than borax, or any composition ever before used for welding iron and steel.

I claim, as a new article of manufacture—

A welding-composition, made of the ingredients and in the manner substantially as described and set forth in the specification.

In testimony that I claim the foregoing, I have hereunto set my hand and seal, this 28th day of April, 1869.

J. B. RAND. [L. S.]

Witnesses:
J. E. LANG,
LUTHER ROBY.